April 5, 1927.

S. E. SHEPPARD ET AL 1,623,500

PHOTOGRAPHIC FILM AND BASE THEREFOR

Filed April 27, 1926

FIG - 1 -

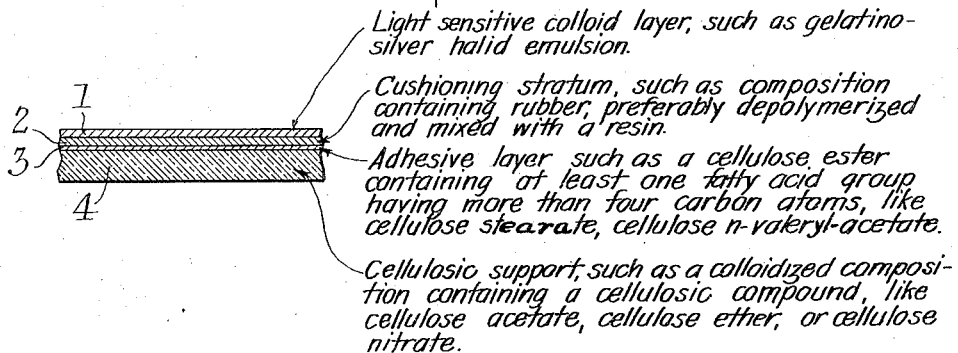

Light sensitive colloid layer, such as gelatino-silver halid emulsion.

Cushioning stratum, such as composition containing rubber, preferably depolymerized and mixed with a resin.

Adhesive layer such as a cellulose ester containing at least one fatty acid group having more than four carbon atoms, like cellulose stearate, cellulose n-valeryl-acetate.

Cellulosic support, such as a colloidized composition containing a cellulosic compound, like cellulose acetate, cellulose ether, or cellulose nitrate.

FIG - 2 -

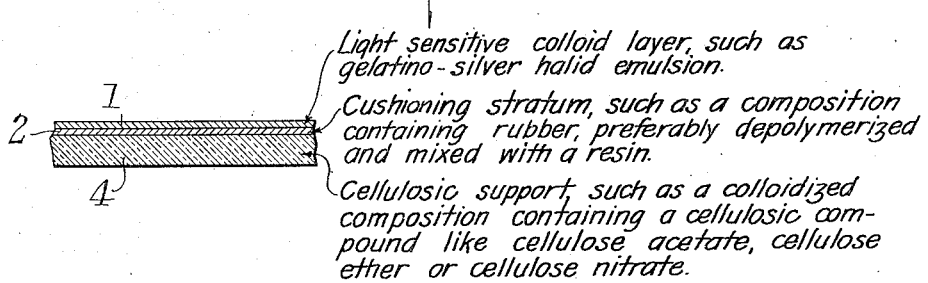

Light sensitive colloid layer, such as gelatino-silver halid emulsion.

Cushioning stratum, such as a composition containing rubber, preferably depolymerized and mixed with a resin.

Cellulosic support, such as a colloidized composition containing a cellulosic compound like cellulose acetate, cellulose ether or cellulose nitrate.

INVENTOR.
Samuel E. Sheppard & Sterling S. Sweet,
BY
ATTORNEY

Patented Apr. 5, 1927.

1,623,500

UNITED STATES PATENT OFFICE.

SAMUEL E. SHEPPARD AND STERLING S. SWEET, OF ROCHESTER, NEW YORK, ASSIGNORS TO EASTMAN KODAK COMPANY, OF ROCHESTER, NEW YORK, A CORPORATION OF NEW YORK.

PHOTOGRAPHIC FILM AND BASE THEREFOR.

Application filed April 27, 1926. Serial No. 104,977.

This invention relates to photographic film and base therefor.

One object of the invention is to provide films which will be highly resistent to cracking, even under adverse conditions, such as severe dryness. Another object of the invention is to provide films in which the several layers remain strongly attached to each other and yet a cushioning layer relieves internal stresses and resists the spread of incipient cracks from one layer to another. A still further object is to provide films having a cellulosic layer and a light-sensitive colloid layer thereon which becomes brittle in a dry atmosphere said films having a yielding cushioning stratum between said layers and strongly attached thereto. Another object is to provide films in which a cushioning layer or stratum containing rubber is interposed between a light-sensitive colloid layer and its cellulosic support and yet the stripping tendency of rubber under these circumstances is counteracted. Still another object of the invention is to produce films in which an adherent cushioning stratum comprises depolymerized rubber with or without a resin. Another object is to provide a film in which some of the useful properties depend upon a layer containing a cellulose ester having at least one fatty acid group of more than four carbon atoms. A further object is to provide film base suitable for producing such films. Other objects will hereinafter appear.

In the accompanying drawing, Figs. 1 and 2 are fragmentary diagrammatic sectional views upon an exaggerated scale of films embodying our invention.

Photographic films comprise generally flexible supports of cellulosic material carrying colloid layers of light-sensitive photographic material. In the case of motion picture films the base or supporting layer comprises a colloidized composition of a cellulosic compound, such as cellulose nitrate, cellulose acetate, or cellulose ether, while the light-sensitive layer usually is a gelatino-silver halid emulsion. Such films are often subjected to conditions of severe dryness, such as exist in heated houses during winter months when the humidity is very low, or in exceptionally dry climates, or under heating and drying conditions imposed in the projections of the films. Under these conditions the light-sensitive colloid layer tends to become brittle and under the mose severe conditions the cracks in the photographic layer spread directly through the cellulosic base, so that the film as a whole can be cracked in pieces. This is true of cellulose acetate and cellulose ether films coated with an adherent gelatino-silver halid emulsion; and is true in the case of film with nitrate base to an extent which requires attention, especially under the more severe conditions.

When the above mentioned cellulosic film bases are dried under conditions which exactly parallel the drying of films comprising such bases coated with light-sensitive emulsions, it has been found that they do not exhibit brittleness to the same degree as do the coated films. While we do not wish to be confined to any theory, our investigations indicate that the greater brittleness of the coated base, in comparison with the uncoated base under parallel conditions, is due to the propagation of cracks which originate in the emulsion of the film and then spread through the base. The effect is also accentuated by internal stresses developed in the film by the different drying characteristics of the light-sensitive layer and the support or base. When the support alone is kept in a very dry atmosphere, there is no coating in which the tendency to cracking is excessive and there are no internal stresses developed through the different contractions of unlike layers.

We have found that films which retain their elasticity to a surprising degree under very severe drying conditions can be prepared by interposing a cushioning stratum between the light-sensitive colloid layer, preferably a gelatino-silver halid emulsion, and the cellulosic supporting layer, the stratum being firmly attached to both layers so as to avoid a stripping tendency. This stratum is elastic and yieldable under stress. Moreover, it is preferably waterproof and transparent, so that the film containing it has all of the desirable properties heretofore obtained in commercial films. It remains flexible even in a dry atmosphere.

In the preferred embodiment of our invention we employ a stratum containing rubber, under conditions in which the stratum adheres sufficiently firmly both to a gelatino-silver halid layer and to a cellulosic layer,—in other words, the conditions are such that it does not act as a stripping layer. In the preferred embodiment of our invention this adhesion of the rubber-containing layer is increased by employing rubber which has been broken down or depolymerized. We have also found that it is of assistance to mix in a resin with this depolymerized rubber. It is a surprising fact that a stratum of such a mixture does not impair the transparency of the film and yet has strong adhesion for the other layers, while relieving the tendency of the film to crack when excessively dried. But such a cushioning layer has a stronger adhesive tendency toward a gelatino-silver halid layer than it does toward a colloidized layer of a cellulosic compound. It adheres to the latter to a highly useful degree but it is desirable to increase this even further for film which is to meet the very worst conditions.

We have found that this adhesion can be effected by using a special adhesive stratum between the cushioning layer and the cellulosic base. Such an adhesive layer preferably contains a cellulose ester having at least one fatty acid group of more than four carbon atoms. For instance, we may employ cellulose stearate, in which all of the acid groups contain a large number of carbon atoms, or we may use mixed esters, such, for example, as cellulose n-valeryl-acetate in which the valeryl group contains more than four carbon atoms. The use of these cellulose esters of higher fatty acids to promote adhesion is especially useful in the case of cellulose acetate films and our description will describe this species of the invention by way of illustration, but it will be understood that the invention is not limited to the details thus given, except as indicated in the appended claims.

While we do not wish to be limited to a particular theory with regard to the action of these higher fatty esters of cellulose, except as indicated in the claims, nevertheless, we believe that the polar or non-polar character of the atomic groups is of great importance. Gelatin being amphoteric has its maximum adhesion to non-polar substances in the region of its own isoelectric point. Consequently satisfactory adhesion exists between our cushioning stratum and the gelatinous emulsion. Since rubber, which we employ in our cushioning stratum, is substantially non-polar, it has a much better adhesion to esters of cellulose which have the polarity greatly suppressed by reason of the presence of one or several groups of the higher fatty acids.

Coming now to illustrative embodiments of our invention, and referring to Fig. 1, a light-sensitive photographic layer 1 is carried by a cellulosic support 4 with an intermediate cushioning stratum 2 and an adhesive stratum 3. In the preferred embodiment of our invention the layer 1 is an ordinary gelatino-silver halid emulsion, such as is employed customarily in motion picture films. While the support 4 may be of any suitable cellulosic material or compound, in the preferred embodiment of our invention we employ a transparent flexible film base of a cellulose acetate composition. The ones described in U. S. Patent No. 1,342,601, Seel, June 8th, 1920, are typical and useful.

While the yieldable cushioning layer 2 may be composed entirely of depolymerized rubber, we have found it useful to include with it a resin. The depolymerization of the rubber may be performed in any of the known ways, the following being merely illustrative.

For instance, 250 parts of plantation crêpe rubber are dissolved in 1000 parts of benzol or toluol, and the solution heated in a bath of boiling toluol for approximately 14 to 16 hours. This bath is a convenient way of maintaining a temperature of approximately 110° C. The rubber can, of course, be heated alone at this temperature or at a somewhat higher temperature, but we prefer to work with the rubber in solution. From the product thus prepared, we make up a 1% solution in benzol. We also provide a 2% solution of a resin, such as dammar, copal, gum benzoin, gum elemi, sanderak; but dammar or elemi are as useful as any. Equal volumes of the two solutions are mixed to provide a solution from which the elastic or yielding cushioning layer can be prepared.

For the production of the adhesive stratum 3, we may prepare a 2% solution of cellulose stearate in a mixture of benzol and acetone, say 2 to 4 parts of the former for 1 part of the latter. Other illustrative 2% solutions are those of cellulose lauryl-acetate, cellulose n-valeryl-acetate or cellulose n-heptyl-acetate in acetone.

The film base 4 is coated with the adhesive stratum 3 from any one of the above described solutions, such as cellulose stearate. This may be the merest wash, or a substantial layer can be built up by successive treatments.

Upon the layer 3 is then spread the cushioning layer 2 from the depolymerized rubber-resin solution hereinabove described. Finally the gelatino-silver halid layer 1 is coated upon the cushioning stratum 3. Of course, each layer is permitted to sufficiently set before the next is applied.

In Fig. 2 we have shown a simplified modification in which the adhesive layer or stratum 3 is omitted. As hereinabove stated, a cushioning stratum of depolymerized rubber and resin has a very useful adhesion to a base 4, such as of cellulose acetate. While the adhesive layer or stratum 3 makes a remarkable improvement in film which must meet the most adverse conditions, and we, therefore, prefer to use it, nevertheless, for films which do not have to meet the most severe conditions the cushioning stratum can be located directly upon the base 4. Even under these conditions the cushioning stratum is attached very firmly to both the layers 1 and 4 and the film does not have stripping characteristics,—in other words, the emulsion layer 1 will not be readily detached from the support 4 either when dry or when wet. It will be evident that the film base carrying the cushioning layer, firmly attached thereto, forms an article of manufacture, which is used as an intermediate in the preparation of the photographic film.

Having thus described our invention, what we claim as new and desire to secure by Letters Patent is:

1. A film comprising a photographic light-sensitive colloid layer, a flexible colloidized cellulosic supporting layer and a non-stripping elastic yieldable waterproof cushioning stratum between said layers and firmly attached to both of them.

2. A film comprising a photographic light-sensitive colloid layer which becomes brittle in a dry atmosphere, a flexible cellulosic supporting layer, and a non-stripping elastic yieldable waterproof cushioning stratum which remains flexible in a dry atmosphere, said stratum being between said layers and firmly attached to both of them.

3. A film comprising a gelatino-silver halid light-sensitive photographic layer, a flexible light-transmitting waterproof supporting layer containing a cellulose ester, and a non-stripping elastic yieldable waterproof light-transmitting cushioning stratum between said layers and firmly attached to both of them.

4. A film comprising a gelatino-silver halid light-sensitive photographic layer, a flexible supporting layer of cellulose acetate composition, and an elastic non-stripping yielding cushioning stratum between said layers and firmly attached to both of them.

5. A film comprising a photographic light-sensitive colloid layer, a flexible colloidized cellulosic supporting layer and a non-stripping yieldable waterproof cushioning layer containing rubber, said stratum being located between said layers and firmly attached to both of them.

6. A film comprising a photographic light-sensitive colloid layer, which becomes brittle in a dry atmosphere, a flexible cellulosic supporting layer and a non-stripping yieldable waterproof cushioning stratum which contains rubber and remains flexible in said dry atmosphere, said stratum being between said layers and firmly attached to both of them, its attachment to said supporting layer being through an adhesive stratum.

7. A film comprising a gelatino-silver halid light-sensitive photographic layer, a flexible light-transmitting waterproof supporting layer containing a cellulose ester, and a non-stripping elastic yieldable waterproof light-transmitting cushioning stratum containing rubber, said stratum being located between said layers and firmly attached to both of them.

8. A film comprising a gelatino-silver halid light-sensitive photographic layer, a flexible supporting layer of cellulose acetate composition, and an elastic non-stripping yielding cushioning stratum containing rubber, said stratum being located between said layers and firmly attached to both of them, the attachment to said cellulose acetate layer being through an adhesive stratum.

9. A film comprising a photographic light-sensitive colloid layer, a flexible colloidized cellulosic supporting layer and a non-stripping elastic yieldable water-proof cushioning stratum containing depolymerized rubber, said stratum being located between said layers and firmly attached to both of them.

10. A film comprising a gelatino-silver halid light-sensitive photographic layer, a flexible light-transmitting waterproof supporting layer containing a cellulose ester, and a non-stripping elastic yieldable waterproof light-transmitting cushioning stratum containing depolymerized rubber, said stratum being located between said layers and firmly attached to both of them, the amount of depolymerized rubber being sufficient to promote said attachment.

11. A film comprising a gelatino-silver halid light-sensitive photographic layer, a flexible supporting layer of cellulose acetate composition, and an elastic non-stripping yielding cushioning stratum containing depolymerized rubber between said layers and firmly attached to both of them, the amount of depolymerized rubber being sufficient to promote said attachment.

12. A film comprising a photographic light-sensitive colloid layer which becomes brittle in a dry atmosphere, a flexible cellulosic supporting layer and a non-stripping elastic yieldable waterproof cushioning stratum, containing rubber and which remains flexible in a dry atmosphere, said stratum being between said layers and firmly attached to both of them, the attachment to said supporting layer being promoted by a cellulose ester containing a fatty acid group having more than four carbon atoms, said ester contacting with said layer and said stratum.

13. A film comprising a gelatino-silver halid light-sensitive photographic layer, a flexible supporting layer of cellulose acetate composition, and an elastic non-stripping yielding cushioning stratum containing rubber and located between said layers, said stratum and said cellulose acetate layer being firmly attached by a cellulose ester containing a fatty acid group having more than four carbon atoms, such ester contacting with said stratum and said layer.

14. A film, comprising a photographic light-sensitive colloid layer which becomes brittle in a dry atmosphere, a flexible cellulosic supporting layer, and a non-stripping elastic yieldable waterproof cushioning stratum containing depolymerized rubber and remaining flexible in a dry atmosphere, said stratum being firmly attached to said supporting layer by a cellulose ester containing at least one fatty acid group having more than four carbon atoms.

15. A film comprising a gelatino-silver halid light-sensitive photographic layer, a flexible supporting layer of cellulose acetate composition, and an elastic non-stripping yielding cushioning stratum containing depolymerized rubber, said stratum being located between said layers and firmly attached to cellulose acetate layer through a cellulose ester containing at least one group of a higher fatty acid of over four carbon atoms.

16. A film comprising a gelatino-silver halid light-sensitive photographic layer, a flexible light-transmitting waterproof supporting layer containing a cellulose ester, and a non-stripping yieldable waterproof light-transmitting cushioning stratum containing depolymerized rubber and located between said layers and firmly attached to both of them, the attachment to said supporting layer being effected through an adhesive light-transmitting stratum of a cellulose ester containing at least one fatty acid group of over four carbon atoms.

17. A film comprising a photographic light-sensitive colloid layer, a flexible colloidized cellulosic supporting layer and a non-stripping yieldable waterproof cushioning stratum containing a rubber and resin composition, said stratum being located between said layers and firmly attached to both of them.

18. A film comprising a gelatino-silver halid light-sensitive photographic layer, a flexible light-transmitting waterproof supporting layer containing a cellulose ester, and a non-stripping yieldable waterproof light-transmitting cushioning stratum containing a rubber and resin composition, said stratum being located between said layers and firmly attached to both of them.

19. A film comprising a photographic light sensitive colloid layer which becomes brittle in a dry atmosphere, a flexible cellulosic supporting layer, and a non-stripping yieldable water-proof cushioning stratum containing depolymerized rubber and a resin, said stratum remaining flexible in a dry atmosphere and being firmly attached to both of said layers.

20. A film comprising a gelatino-silver halid light-sensitive photographic layer, a flexible transparent supporting layer of cellulose acetate composition, and a transparent non-stripping yielding cushioning stratum containing depolymerized rubber and a resin and located between said layers, being firmly attached to both of them.

21. A film comprising a photographic light-sensitive colloid layer, a flexible cellulosic supporting layer, a non-stripping yieldable waterproof cushioning stratum containing a rubber and resin composition, and an adhesive stratum between said cushioning stratum and said supporting layer, said adhesive stratum containing a cellulose ester having at least one fatty acid group of more than four carbon atoms.

22. A film comprising a photographic light-sensitive colloid layer, a flexible cellulosic supporting layer, a non-stripping yieldable waterproof cushioning stratum containing a rubber and resin composition located between said layers and a stratum of cellulose stearate between said cushioning stratum and said supporting layer.

23. A film comprising a photographic light-sensitive colloid layer, which becomes brittle in a dry atmosphere, a flexible cellulosic supporting layer, a non-stripping yieldable waterproof cushioning stratum containing depolymerized rubber and a resin and remaining flexible in said dry atmosphere, and an adhesive stratum connecting said cushioning stratum to said supporting layer, said adhesive stratum containing a cellulose ester having at least one fatty acid group containing more than four carbon atoms.

24. A film comprising a gelatino-silver light-sensitive photographic layer, a flexible transparent supporting layer of cellulose acetate composition, a transparent non-stripping yielding cushioning stratum containing depolymerized rubber and a resin, and located between said layers and a transparent adhesive stratum connecting said cushioning stratum to said cellulose acetate layer, said adhesive stratum comprising a cellulose ester containing at least one fatty acid group of more than four carbon atoms.

25. A film comprising a photographic layer carried by a laminated support at least one layer of which includes a cellulosic ester having at least one fatty acid group of more than four carbon atoms.

26. A film comprising a photographic layer carried by a laminated support, at least one layer of which contains cellulose stearate.

27. A film comprising a photographic layer carried by a laminated support, which includes in the composition in at least one of its layers depolymerized rubber.

28. A film comprising a photographic layer carried by a laminated support, at least one layer of which contains a composition comprising rubber and a resin.

29. A film comprising a photographic layer carried by a laminated support at least one layer of which includes a composition containing depolymerized rubber and a resin.

30. As an article of manufacture, a flexible waterproof laminated sheet comprising a layer containing rubber and a layer containing a cellulosic compound, said layers being firmly united by a cellulose ester containing at least one fatty acid group having more than four carbon atoms.

31. As an article of manufacture, a transparent flexible waterproof laminated sheet comprising a layer containing a rubber and resin composition and a layer containing a cellulosic compound, said layers being firmly united by a cellulose ester containing at least one fatty acid group having more than four carbon atoms.

32. As an article of manufacture, a flexible waterproof laminated sheet comprising a layer containing depolymerized rubber and a layer containing a colloidized cellulosic compound, said layers being firmly united by a cellulosic ester containing at least one fatty acid group having more than four carbon atoms.

33. As an article of manufacture, a transparent flexible waterproof laminated sheet comprising a layer containing depolymerized rubber and a resin, together with a layer containing a colloidized cellulosic compound, said layers being firmly united by a cellulose ester containing at least one fatty acid group of more than four carbon atoms.

34. As an article of manufacture, a transparent flexible waterproof laminated sheet comprising a layer containing depolymerized rubber and a resin, a layer of colloidized cellulose acetate, said layers being firmly united by cellulose stearate.

Signed at Rochester, New York, this 22nd day of April, 1926.

SAMUEL E. SHEPPARD.
STERLING S. SWEET.